Figure 1:
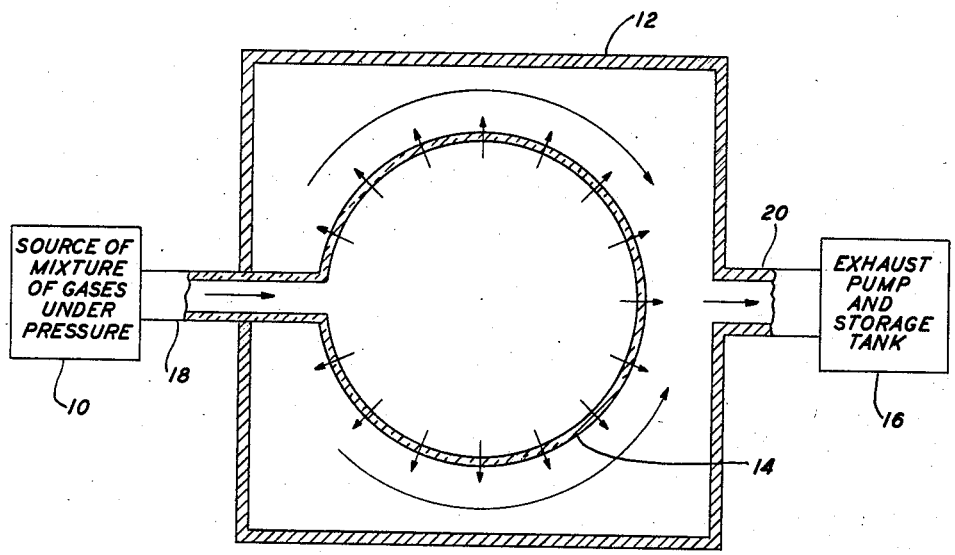

June 30, 1959  G. T. KOHMAN ET AL  2,892,508
SEPARATION OF GASES BY DIFFUSION
Filed April 17, 1957

INVENTORS  G. T. KOHMAN
W. P. MASON
K. B. McAFEE JR.

BY *H. O. Wright*
ATTORNEY

United States Patent Office 2,892,508
Patented June 30, 1959

2,892,508

SEPARATION OF GASES BY DIFFUSION

Girard T. Kohman, Summit, Warren P. Mason, West Orange, and Kenneth B. McAfee, Jr., Summit, N.J., assignors to Bell Telephone Laboratories, Incorporated, New York, N.Y., a corporation of New York Application April 17, 1957, Serial No. 653,471

5 Claims. (Cl. 183—2)

This invention relates to methods and apparatus for the separation or purification of gases. More particularly, it relates to methods and apparatus for the separation or purification of gases by diffusion and/or by selective diffusion.

It has long been known, for example, that helium will pass by diffusion at room temperature through glass and that an appreciable number of other gases will more or less readily diffuse through various types of glass, particularly at temperatures several hundred degrees centigrade above room temperature and through the more "open" types of glass and ceramic materials having vitric properties, that is, ceramics which include an appreciable amount of glass forming substances which act as a binder or network for holding the ceramic together. As a general rule, the rate of diffusion at a given temperature is approximately proportional to the pressure of the gas upon the glass or ceramic.

The present invention is based upon the discovery that glasses and vitric ceramics subjected to tensile stress exceeding approximately fifty percent of the tensile stress at which they fracture will exhibit a substantially increased rate of diffusion over that which would be expected on the basis of the heretofore accepted teachings of the prior art. The rate of diffusion increases still more rapidly as the tension is further increased to more nearly approach the breaking tensile stress. The phenomenon has been found to be reversible, the glass or ceramic recovering its normal properties when the tension is released. By way of a specific example of the phenomenon, the diffusion of helium through chemical Pyrex glass at room temperature was increased by a factor of approximately ten when the glass was stressed to approximately ninety percent of its breaking tensile strength as compared with the diffusion which would normally be expected on the basis of the teachings of the prior art. The breaking tensile stress of a one inch diameter sphere of chemical Pyrex glass .005 inch thick was, for example, found to vary appreciably from sample to sample, but was usually between 100 and 150 pounds per square inch. "Flame annealing" at approximately five hundred degrees centigrade for a minute or two has been found to decrease the tendency of the glass to break under tension.

It is, of course, well known to those skilled in the art that when diffusion is present at room temperature for any specific gas through a specific type of glass or ceramic, the diffusion is usually increased very appreciably with increase in temperature.

Some gases, such as hydrogen and deuterium, will not diffuse through, for example, pure amorphous silica glass at room temperature to any significant extent but will diffuse in appreciable amounts at temperatures in the order of six to eight hundred degrees centigrade.

For glass which it is feasible to "blow," a convenient diffusing element is a sphere as shown in the accompanying drawings. Unsintered amorphous silica, commonly known as "thirsty" glass, however, cannot readily be shaped into a sphere so that a diffusing element employing "thirsty" glass must be designed to comprise substantially flat diffusing surfaces, for example, it can be a cubic or rectangular enclosure, one or more major surfaces of which consist of thin sheets of "thirsty" glass. In general, a sphere is preferable since a substantially uniform tensing of its entire surface is readily effected by the pressure of the gases within it. However, reasonably satisfactory results can be obtained with a substantially cubic enclosure or with a cylindrical enclosure.

In some instances two gases which it is desired to separate may both pass by diffusion through a particular type of glass at a particular temperature but at largely differing rates, in which case several consecutive stages of separation by diffusion will, obviously, tend to appreciably reduce or even to substantially eliminate the gas having the slower rate of diffusion, thus "purifying" the other.

A principal object of the invention is to facilitate a more rapid separation or purification of gases by the phenomenon of diffusion through glass and ceramics.

Other and further objects, features and advantages of the invention will become more readily apparent during the course of the following detailed description of illustrative embodiments for practicing various principles of the invention and from the appended claims.

Figure 2:
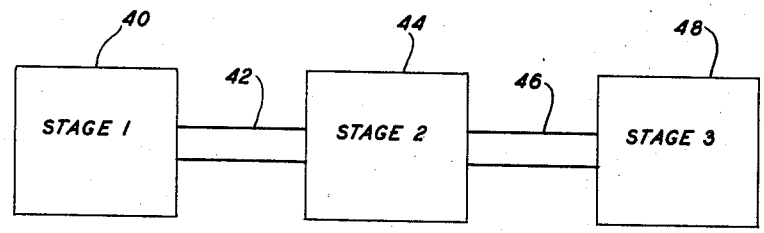

In the accompanying drawings:

Fig. 1 illustrates diagrammatically an arrangement for practicing certain principles of the invention; and Fig. 2 illustrates diagrammatically a further arrangement for practicing principles of the invention.

In Fig. 1, a source 10 of a mixture of gases under pressure is connected to a glass sphere 14 by a tube 18. The pressure of the gases thus reaching and filling sphere 14 is made sufficient to produce a tensile stress at all points of sphere 14 in excess of fifty percent of the breaking tensile stress of the glass but insufficient to cause fracture of the glass. The pressure of the mixture of gases in source 10 is maintained substantially constant during operation of the equipment by any of numerous suitable devices or arrangements well known to those skilled in the art so that the enhanced rate of diffusion will be continuously maintained.

To simplify the drawing, a single glass sphere 14 is shown in Fig. 1. It is obvious that increased capacity can be readily realized by employing a plurality of spheres such as sphere 14 of Fig. 1, all connected to source 10 and all enclosed within the gas tight enclosure 12. In a typical case, sphere 14 had a diameter of approximately one inch and the thickness of the glass was approximately .005 inch. The practical considerations influencing the choice of the number of spheres, the sphere diameters, and glass thickness are, of course, the volume of gas per unit of time it is desired to purify by the diffusion process and the combination of maximum sphere diameter and the minimum glass thickness which will withstand the maximum pressure it is feasible to use. The sphere 14 (or a plurality of such spheres all connected to source 10, if several spheres are used) may conveniently be referred to as a "diffusing section" or simply as a "diffuser."

The glass should, of course, be free from pinholes, bubbles, rib lines, inclusions of foreign material and thin spots, and should be flame annealed as described hereinabove, so that it can withstand as great a tensile stress as possible, since the rate of diffusion rapidly increases with increase of tensile stress beyond the minimum stress at which the abnormal diffusion of the invention is first realized.

As mentioned hereinabove, cubic or cylindrical diffusing enclosures can produce satisfactory results but a spherical shape is preferable in that it is readily susceptible to more uniform tensing of its entire surface.

Assuming that the mixture of gases from source 10 comprises a first gas which will normally diffuse more or less readily through the glass sphere 14 and a second gas which will normally not diffuse through the glass sphere 14 to any appreciable extent, it will be found that when the pressure within sphere 14 has been increased to a point at which the tensile stress in the glass of sphere 14 exceeds fifty percent of the breaking tensile stress of the glass (but is, of course, still less than the breaking tensile stress) the first gas will diffuse through the glass at an appreciably greater rate than would be expected from prior art teachings and the second gas still not diffuse through the glass to any appreciable extent.

As a specific example, for a glass sphere of chemical Pyrex glass and a mixture of the two gases helium and hydrogen, at room temperature, the diffusion of helium through the glass will be very substantially increased when the glass is stressed beyond fifty percent of its breaking tensile strength but not to fracture of the glass, whereas the diffusion of hydrogen will still be substantially nonexistent. Thus substantially pure helium can be obtained at a much faster rate than would be expected from prior part teachings.

Detailed calculations based on the postulated structure of glass and measurements made of the heretofore described stress enhanced diffusion have led to the conclusion that glass and ceramics must have submicroscopic fissures which are further opened by sufficient tension to permit the helium or other diffusing gas to pass more freely but which are nevertheless so small that the passage or diffusion of the hydrogen or other nondiffusing gas is not perceptibly affected.

Sphere 14 is surrounded by a gas-tight enclosure 12 which is connected by tube 20 to an exhaust pump and storage tank 16 into the tank of which the gas diffusing through sphere 14 is pumped from enclosure 12. Where several stages are to be employed in sequence to effect a more complete separation of a gas having a high diffusion rate from a gas having a low diffusion rate, as will be discussed in connection with Fig. 2, the exhaust pump should maintain the pressure of its associated storage tank at a level suitable for introduction into the next stage. The pressure should of course be sufficient to stress the sphere 14 of the next stage of a tensile stress in excess of fifty percent of its breaking tensile stress.

The portion of the arrangement of Fig. 1 comprising enclosure 12, tube 20, and exhaust pump and storage tank 16 may be conveniently referred to as a "collecting section" or simply as a "collector."

For the above-mentioned specific mixture of helium and hydrogen, at room temperature, substantially all of the helium will diffuse through sphere 14 and be collected in section 16, while substantially all of the hydrogen will remain in sphere 14 and source 10. A one stage diffuser-collector arrangement as illustrated in Fig. 1 will, therefore, suffice to separate or purify helium from hydrogen at room temperature.

In the event that one of the gases to be filtered out by the arrangement of Fig. 1 still appears in objectionable quantity in the collector section 16, several stages may be employed in succession as illustrated diagrammatically by Fig. 2.

In Fig. 2 stages 1, 2 and 3 are represented diagrammatically by boxes 40, 44 and 48, respectively, and each may be substantially identical to the arrangement illustrated in Fig. 1, except that the storage tank of stage 1 (40) is connected through a conduit 42 to serve as the input mixture source of stage 2, and that of stage 2 (44) is connected through a conduit 46 to serve as the input mixture source of stage 3 (48).

By way of illustrative example of the effect of "selective diffusion" involving the use of several consecutive diffuser-collector stages, let it be assumed that an equal, or one to one, mixture of two gases A and B is introduced into the source of stage 1 under pressure sufficient to stress the glass diffusing sphere of that stage to a tensile stress in excess of fifty percent of but less than its breaking tensile stress. Let it be further assumed that the rate of diffusion of gas A through the glass sphere is substantially ten times that of gas B. When a given quantity of gas A has diffused through the sphere, only one-tenth as much of gas B will have been diffused. Therefore in the collector of stage 1 the mixture will comprise ten parts of gas A to one part of gas B.

In similar manner in stage 2, when a given quantity of gas A has diffused through the sphere of that stage, only one-tenth of one-tenth of the gas B will have been diffused. In other words, the mixture will comprise one hundred parts of gas A to one part of gas B. Likewise, at the output of stage 3 when a given quantity of gas A has diffused through the sphere of stage 3, there will be found to be one thousand parts of gas A to one part of gas B. Additional stages can obviously be employed if a further reduction in the amount of gas B present is desired. Thus substantially any desired degree of purification can be realized by the use of a sufficient number of stages. Two gases which will behave in substantially this manner are helium and oxygen when a diffusing medium of unsintered amorphous silica glass ("thirsty" glass) is employed in each stage.

Numerous mixtures of gases can be purified by the application of the principles of the invention as will be apparent to those skilled in the art.

In addition to the purification of helium by diffusion from a mixture including hydrogen, as a further specific illustration, hydrogen may be diffused from a mixture of hydrogen and deuterium using amorphous silica glass, known by the trade name "Vycor," at a temperature in the order of eight hundred degrees centigrade, the relative rates of diffusion being in the ratio of two to one, respectively, for hydrogen and deuterium. Other specific illustrative examples are hydrogen and tritium; and neon and helium.

Numerous and varied other methods and arrangements within the spirit and scope of the principles of the present invention will readily occur to those skilled in the art. The above examples are illustrative of the application of said principles but by no means exhaustively demonstrate their application.

What is claimed is:

1. Apparatus for enhancing the separation or purification of gases by diffusion on the basis of atomic or molecular size comprising a vessel of a vitric material which will pass a predetermined gas by diffusion but be substantially impermeable to one or more other gases, means for injecting a mixture of said predetermined gas and said one or more other gases into said vessel, means to subject the walls of said vessel to tensile stress in excess of fifty percent of the breaking tensile stress of the material but less than said breaking stress, and means to collect gas diffusing through the vessel.

2. A method of separating or purifying gases, comprising injecting the mixture of gases to be separated into an enclosure of a vitric material which will pass a predetermined gas of said mixture by diffusion but be impermeable to other gases of said mixture, increasing the pressure of said mixture of gases to stress the walls of the enclosure to a tensile stress in excess of fifty percent of its breaking tensile stress but less than said breaking stress, and collecting the gas which diffuses through said enclosure.

3. Apparatus for separating a specific gas from a mixture of gases which comprises a sphere of a glass having a diffusing rate for said specific gas substantially greater than the diffusing rate for any other gas in said mixture, means for injecting said mixture of gases into said sphere with a pressure sufficient to subject said sphere to a tensile stress in excess of fifty percent of but less than the breaking tensile stress of said glass, and means for collecting the gas which diffuses through said sphere.

4. Apparatus for separating helium from hydrogen in a mixture of said gases, comprising an enclosure of chemical Pyrex glass, means for injecting said mixture into said enclosure, means for increasing the pressure of said mixture to stress said enclosure to tensile stresses in excess of fifty percent of but less than the breaking tensile stress of said glass, and means to collect helium diffusing through said enclosure.

5. A medium for filtering gases of varying diffusion rates, comprising a membrane of a vitric material which passes predetermined ones of said gases by differing diffusion rates, respectively, and means for placing said membrane under tensile stress exceeding fifty percent of the breaking tensile stress of said membrane but less than said breaking stress.

References Cited in the file of this patent

UNITED STATES PATENTS

| | | |
|---|---|---|
| 2,540,151 | Weller et al. | Feb. 6, 1951 |
| 2,734,592 | Jones | Feb. 14, 1956 |
| 2,773,561 | Hunter | Dec. 11, 1956 |